(12) United States Patent
Carnahan et al.

(10) Patent No.: US 6,474,735 B1
(45) Date of Patent: *Nov. 5, 2002

(54) ADJUSTABLE CAR SEAT

(75) Inventors: Michael Carnahan, Bedford; Gary Lemmeyer, Hudson, both of OH (US)

(73) Assignee: Graco Children's Products Inc., Exton, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,893

(22) Filed: Oct. 7, 1998

(51) Int. Cl.⁷ .................................................. B60N 2/28
(52) U.S. Cl. ............................ 297/250.1; 297/256.13; 297/411.36
(58) Field of Search ........................... 297/250.1, 256.1, 297/256.11, 256.13, 411.35, 411.36

(56) References Cited

U.S. PATENT DOCUMENTS

| | | | |
|---|---|---|---|
| 3,761,126 A | * 9/1973 | Mulholland et al. | 297/411.36 X |
| 3,926,473 A | 12/1975 | Hogan | 297/115 |
| 4,643,474 A | 2/1987 | Wise et al. | |
| 4,655,506 A | 4/1987 | Wise et al. | |
| 4,738,489 A | 4/1988 | Wise et al. | |
| D298,388 S | 11/1988 | Wise et al. | |
| 4,909,574 A | 3/1990 | Sedlack | |
| 5,022,669 A | * 6/1991 | Johnson | 297/467 X |
| 5,082,325 A | 1/1992 | Sedlack | |
| D324,611 S | 3/1992 | Sedlack | |
| 5,125,717 A | * 6/1992 | Sköld et al. | 297/256.11 |
| 5,181,761 A | * 1/1993 | Meeker | 297/256.13 |
| 5,286,090 A | * 2/1994 | Templin et al. | 297/467 X |
| 5,335,964 A | 8/1994 | Sedlack et al. | |
| D355,986 S | 3/1995 | Myers | |
| 5,427,432 A | 6/1995 | Meeker et al. | 297/256.15 |
| D365,691 S | 1/1996 | Sedlack | |
| 5,486,037 A | 1/1996 | Harper | |
| 5,580,126 A | 12/1996 | Sedlack | |
| 5,609,393 A | * 3/1997 | Meeker et al. | 297/456.13 |
| 5,664,833 A | 9/1997 | Celestina-Krevh et al. | |
| 5,733,004 A | 3/1998 | Celestina-Krevh et al. | |
| 5,746,478 A | * 5/1998 | Lumley et al. | 297/256.13 |
| 5,810,445 A | * 9/1998 | Surot | 297/250.1 X |
| 5,836,650 A | 11/1998 | Warner, Jr. et al. | 297/256.11 |

FOREIGN PATENT DOCUMENTS

| | | |
|---|---|---|
| EP | 0056614 | 1/1982 |
| EP | 0121899 | 4/1984 |
| EP | 0302607 | 7/1988 |
| EP | 0 816 163 | 1/1998 |
| FR | 2748919 | 5/1996 |
| GB | 1201043 | 10/1967 |
| GB | 1541885 | 3/1976 |
| GB | 1581408 | 5/1978 |
| GB | 2123686 | 4/1982 |
| GB | 2 245 161 | 1/1992 |
| GB | 2 266 839 | 11/1993 |

OTHER PUBLICATIONS

WPI Abstract Acct. No. 1998–122099 & DE29721468U (Keiper Recaro).
WPI Abstract Acct. No. 1998–035359 & FR2748919A (Mathou).

* cited by examiner

Primary Examiner—Peter R. Brown
(74) Attorney, Agent, or Firm—Foley & Lardner (57) ABSTRACT

A car seat is constructed to be adaptable for use by children within the toddler-size range and the youth-size range. In particular, the car seat includes cam-shaped arm rests which can be rotated about an axis roughly parallel to a seat bottom, with the rotation resulting in supporting surfaces at different heights relative to the seat bottom. In addition, the car seat has a base portion which allows a seat body to be reclined relative to the base portion, and a five-point harness which is easily removed or adjusted for children of varying heights. The car seat also has a moveable or removable head support. The car seat can be adjusted for children of varying heights and weights, avoiding the costs of multiple car seats for different sized children.

25 Claims, 10 Drawing Sheets

ADJUSTABLE CAR SEAT

BACKGROUND OF THE INVENTION

1. Field of the Invention

The present invention generally relates to adjustable seats for children. In particular, the present invention relates to child restraint seats for vehicular travel which are adaptable to accommodate the seating/support needs of a large range of children from small toddlers to children old enough to use adult lap/shoulder belts.

2. Related Art

Child restraint seats are typically provided in a plurality of sizes and configurations. Generally, conventional car seats are "grown out of" in relatively short time periods and need to be replaced at various milestones in the physical development of the child, which can vary widely among different children. The replacement commonly occurs long prior to the end of the life expectancy of the cox seat.

For instance, parents must initially place infants in infant car seats, which face rearwardly, for vehicular travel. The infant car seats provide a safety zone about an infant which is substantially horizontal thereby allowing the infants, who are not able to sit up on their own, to lie or recline in the seat. Once the child is able to sit up on their own, the infant seat is replaced by a toddler-sized seat. The toddler-sized seat typically provides a forward-facing and slightly reclined seating environment for the toddler. The toddler seat is secured to the rear seat of a vehicle and tends to include a harness to securely hold the child within the seat. Eventually, however, the child outgrows the toddler-sized seat and progresses to a youth-sized seat. The youth-sized seat generally functions primarily as a booster seat and is sized to accommodate children older than toddlers.

Thus, due to the high growth rate and varying needs of children, the required child restraint seats must be replaced relatively frequently to accommodate the changing sizes, weights and needs of the child. Additionally, parents, and other adults transporting children, often have multiple children who may or may not fit within the same seat model. If all of the children do not fit within the same seat model, the entire seat must be replaced with a different seat, depending on the size or needs of the child being transported.

It is therefore an object of the invention to reduce the costs and inconvenience associated with such frequent replacement of child restraint seats for vehicular travel.

SUMMARY OF THE INVENTION

In accordance with this object, the present invention provides a more versatile child restraint seat which can be quickly and readily adapted to children who fall within a large size and weight range, such as toddlers through youths. In addition to reducing the replacement costs for child restraint seats, the preferred embodiment, provides an ability to customize the positions of various features for improved comfort and support.

In accordance with one aspect of the present invention, a child restraint seat includes a seat body having a back portion and a seat portion, and two arm rests. The arm rests extend substantially normal to the back portion, and are movable between a first position and a second position. In the first position, each arm rest has a first supporting surface, and in the second position each has a second supporting surface. The first supporting surface is higher than the second supporting surface relative to the seat portion.

In accordance with another aspect of the invention, a child restraint seat is provided for mounting on a vehicle seat cushion. The seat includes a seat body, which in turn has a back portion, a seat portion, and a channel configured to receive a portion of a vehicular seat belt. Two moveable arm supports are also attached to the seat body. A platform to recline the seat is arranged below the seat portion of the seat body by a pivoting connection. The seat portion is thus pivotable between a first position relative to the platform and a second position relative to the platform.

In accordance with another aspect of the invention, a child restraint seat includes vertically adjustable arm rests, a seat body, a height adjustable seat harness,s and a reclining mechanism. Desirably, the seat thus includes many adjustable features to enable conversion of the seat to safely and comfortably accommodate children of different sizes.

In accordance with another aspect of the invention, a method is provided for adjusting a child restraint seat. The method includes rotating an arm rest about an axis which is substantially parallel to a seat bottom portion.

BRIEF DESCRIPTION OF THE DRAWINGS

These and other aspects of the invention will be apparent from the description below, in combination with the drawings of the preferred embodiment, which are intended to illustrate and not to limit the invention, wherein:

FIG. 5a is a partial sectional view of the car seat, showing an arm rest latching mechanism in an unlocked position;

FIG. 5b is a partial elevational section taken along lines 5b—5b of FIG. 5a;

FIG. 5c is a partial top down section, taken along lines 5c—5c of FIG. 5a;

FIG. 6a is a partial sectional view similar to FIG. 5a, but showing the arm rest latching mechanism in a locked position;

FIG. 6b is a partial sectional view taken along lines 6b—6b of FIG. 6a;

FIG. 6c is a partial top down section, taken along lines 6c—6c of FIG. 6a;

DETAILED DESCRIPTION OF THE PREFERRED EMBODIMENT

Figure 1:
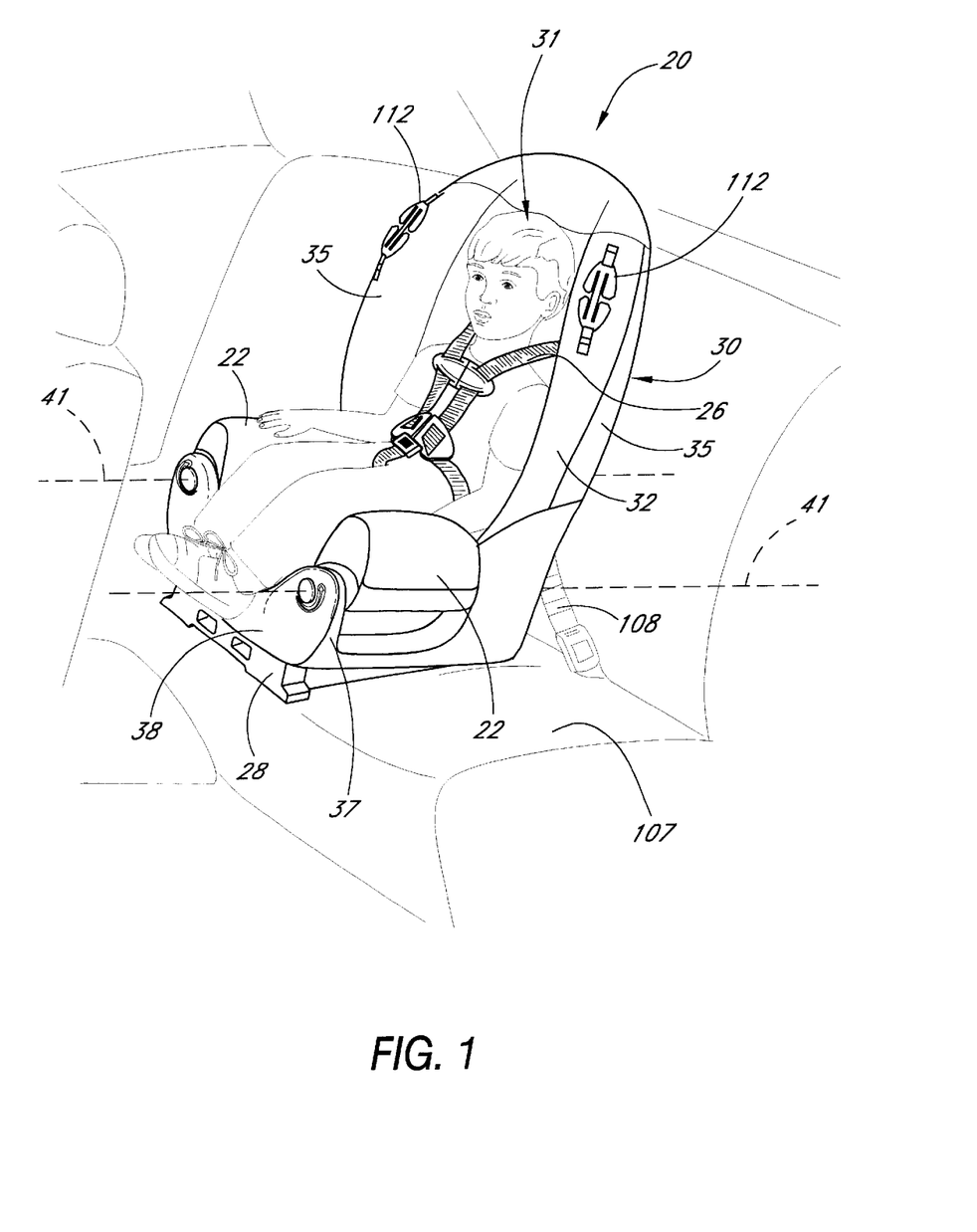
FIG. 1 is a perspective view of a car seat having features in accordance with a preferred embodiment of this invention, depicted with an occupant and mounted over a vehicle seat cushion.

FIG. 1 illustrates an embodiment of a reclinable toddler car seat 20 having aspects, features and advantages in accordance with the present invention. The car seat 20 is adaptable for use with children of different sizes within the range of about 20–65 lbs. In its typical fields of use, the car seat forms a portion of a protective restraint system for motor vehicles and aircraft. The skilled artisan will recognize, however, that certain aspects of the illustrated car seat can be readily adapted to swing seats, highchairs, booster seats, and other types of children's chairs.

Figure 2:
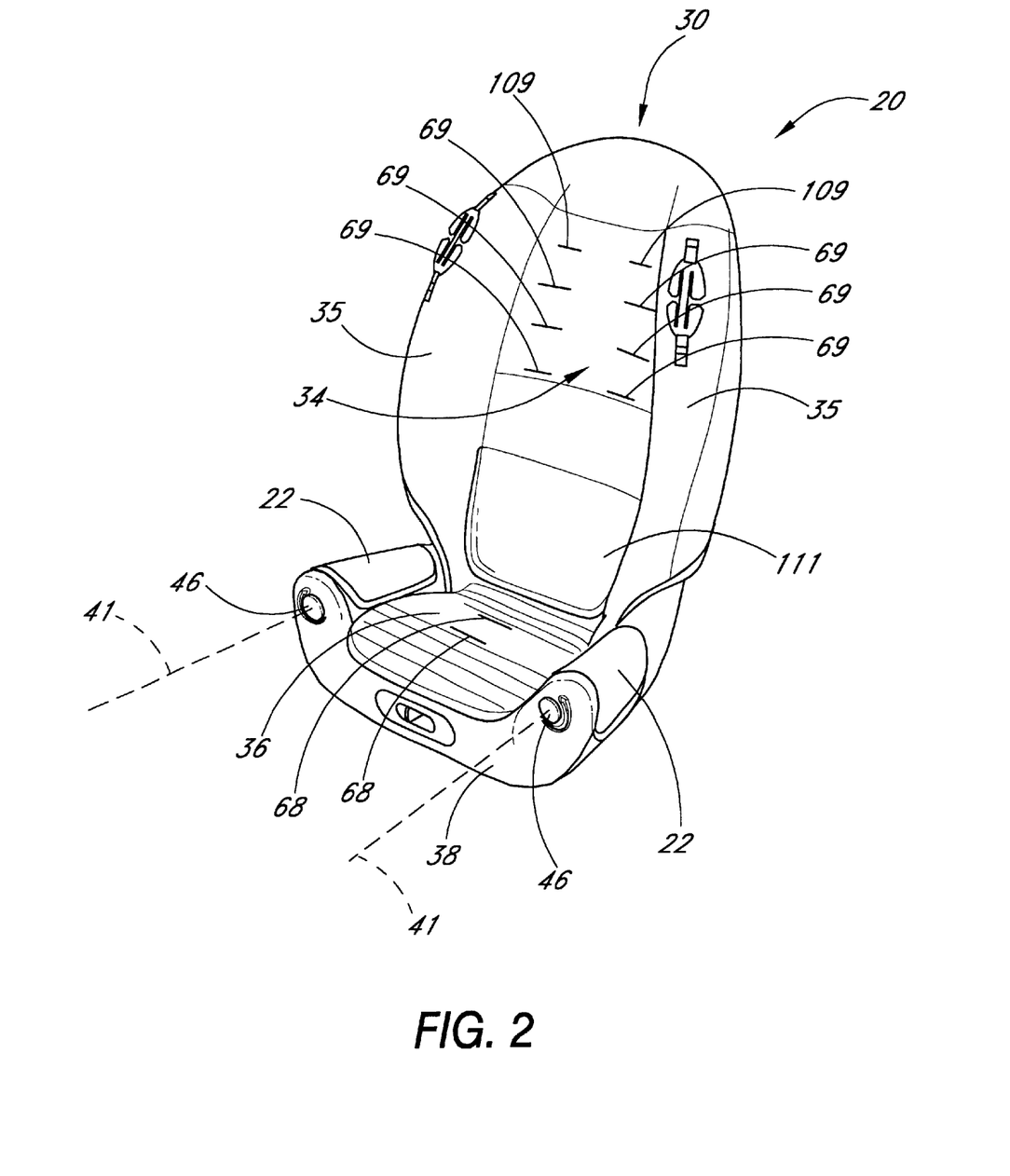
FIG. 2 is a perspective view of the car seat of FIG. 1, in isolation and without an occupant.
Figure 7:
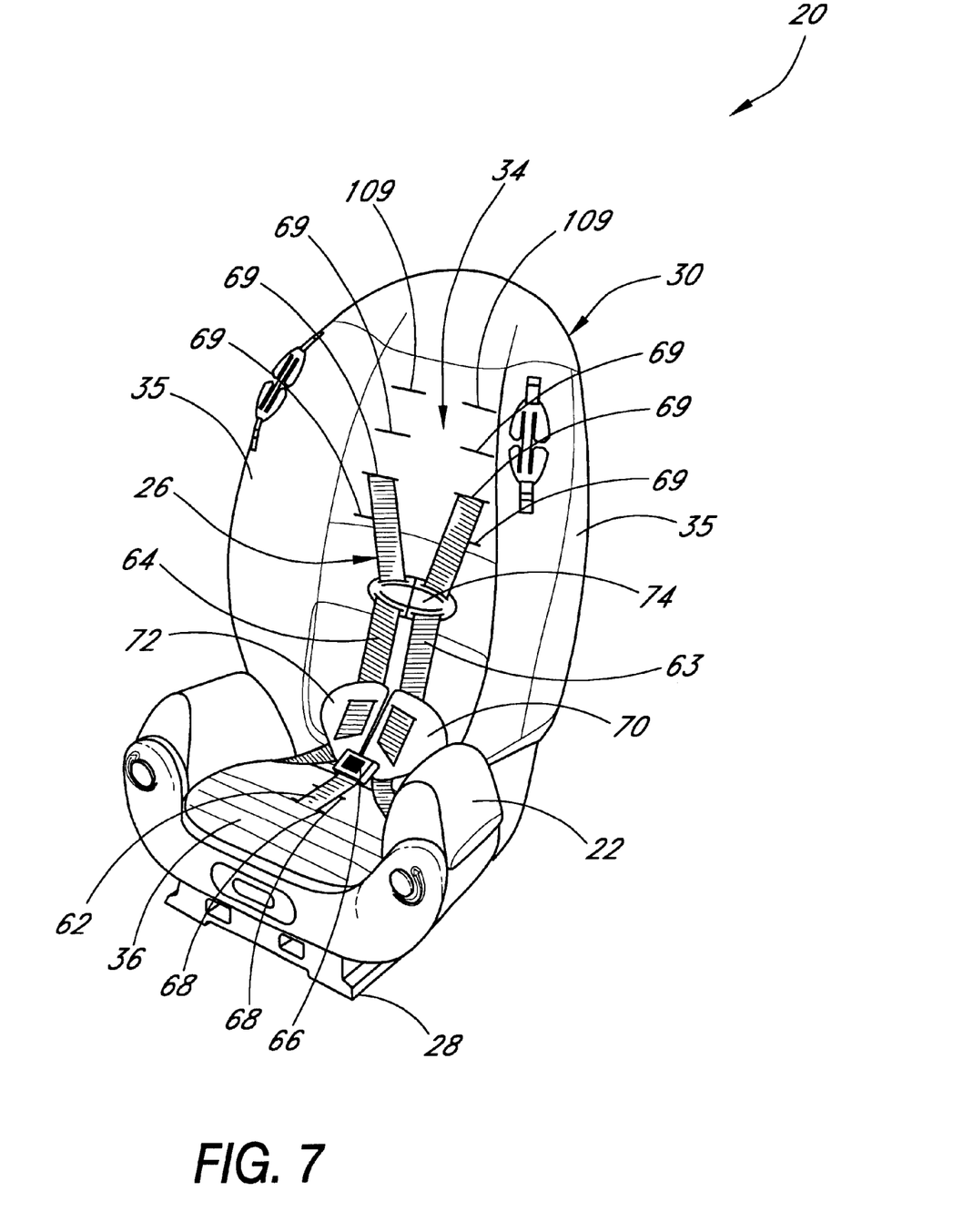
FIG. 7 is a perspective view of the car seat with a five-point harness.
Figure 8:
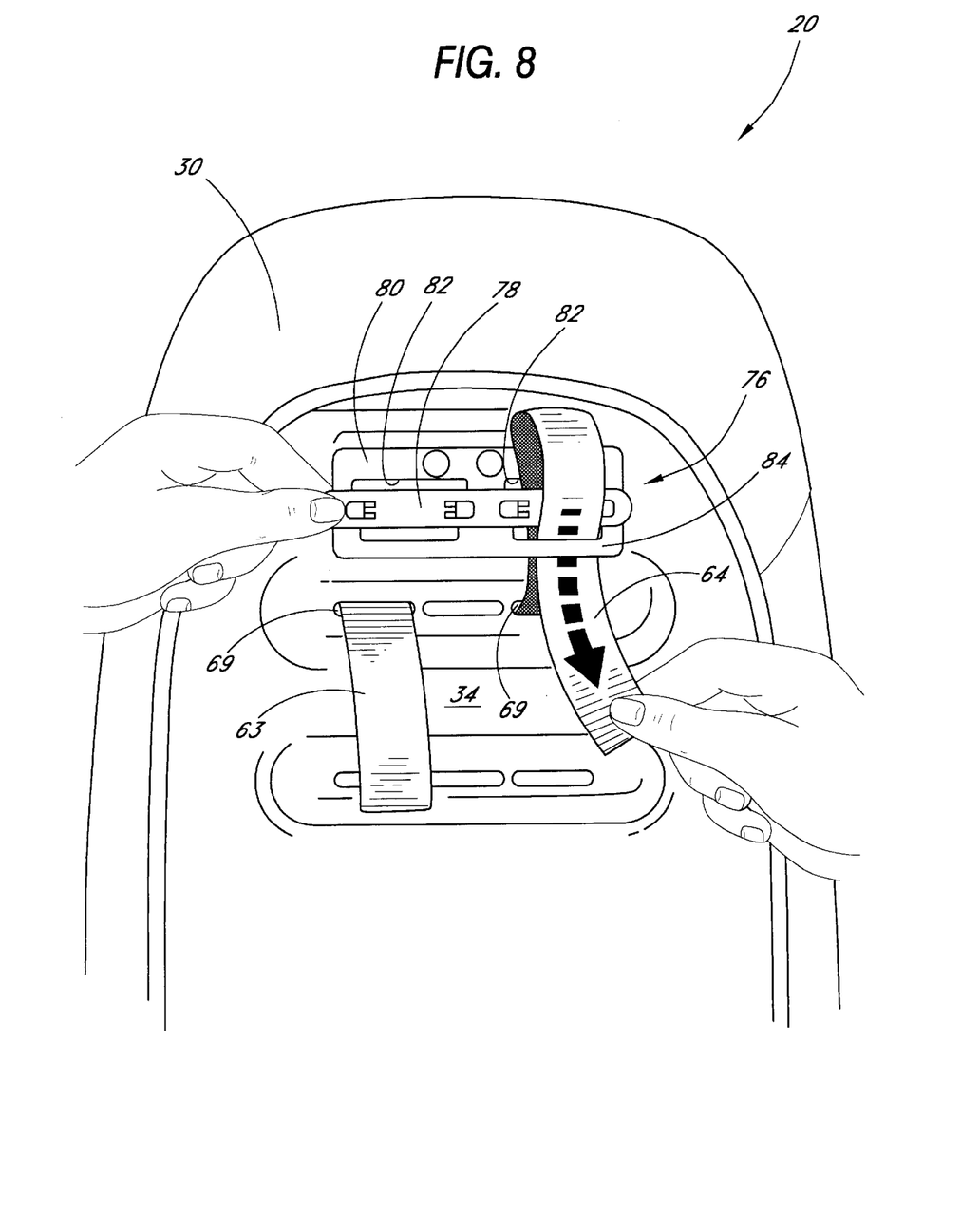
FIG. 8 is a rear elevational view of the seat, showing a belt adjuster for securing the harness of FIG. 7 behind the seat.

The car seat 20 can be quickly and easily adjusted by a parent to accommodate children of different sizes. In the illustrated embodiment, the car seat 20 includes several adjustable features for this purpose. For example, a pair of arm rests 22 are adjustable between an upper position (FIG. 1) and a lower position (FIG. 2). The car seat also has an adjustable head support pillow 24 (FIG. 12), to provide lateral support to a child's head at varying heights. In addition, a harness system 26, discussed below with respect to FIGS. 7 and 8, is height adjustable. The seat angle of recline can be adjusted by moving a seat base 28 relative to a seat body 30. Each of these features, and the combination thereof, facilitate simple adjustment of the seat 20 to fit children of different sizes, as will be better understood from the following description.

FIGS. 1 and 2 illustrate the major components of the seat 20. FIG. 1 a child 31 seated in the seat body 30 and secured with the harness 26. As best seen from FIG. 2, a detachable fabric cover 32 covers portions of the outside of the seat body 30 and can be attached in any suitable manner, such as Velcro™, mounting posts, mounting plugs, adhesive, or mechanical fasteners such as hooks, buttons or straps. Preferably, the seat cover 32 includes padding appropriately positioned to make the seat 20 comfortable for seating.

The seat body 30 includes a seat back portion 34 (FIG. 3A) with right and left side walls 35, a seat bottom portion 36 (FIG. 2), and right and left arm rest posts 37. These elements of the seat body 30 are desirably integrally formed together with adjustable arm rests 22, these elements cooperate to define the seating area for supporting the child 31.

The seat 20 further includes an end plate 38 secured to the seat body 30, defining the front surface of the seat 20. As will be understood from the following description, the end plate 38 facilitates assembly of the arm rests 22 and the seat base 28 to the seat body 30.

The car seat 20 is desirably impact resistant and not easily damaged by normal wear and tear. The seat body 30 may be made of a thermoplastic or thermosetting plastic. As will be recognized by those of skill in the art, the seat body 30 can be constructed with voids or cavities in a thin, molded outer shell to decrease weight and reduce material cost without materially affecting the strength or durability of the seat body.

Adjustable Arm Rests

As noted, the seat 20 further includes a pair of arm rests 22 which are movably mounted to the seat body 30 for height adjustment. FIG. 1, for example, illustrates the arm rests 22 in an upper position, to provide added side support appropriate for a child 31 in the toddler stage (e.g., 20–40 lbs), whereas FIG. 2 shows the arm rests 22 in a lower position, appropriate for a child past the toddler stage (e.g., 30–65 lbs).

Preferably, each arm rest 22 is rotatably mounted to the seat body 30 and height adjustment is accomplished by rotating the arm rest 22 or a portion thereof. In the illustrated embodiment, each arm rest 22 is shaped like a cam, that is, asymmetrical about an axis of rotation 41, and the supporting surfaces of the arm rest are parallel to the axis of rotation 41. Thus, at different rotational positions, the upper surface of the arm rest 22 is at a different height relative to the seat bottom portion 36. The illustrated axis of rotation 41 is substantially parallel to the seat portion 36 of the seat body 30 and substantially perpendicular to the seat back 34.

The cam-shaped surface of each arm rest 22 is desirably contoured to blend into the exterior side portions of the seat body 30 and not to extend over the outside contour of the seat body 30. Advantageously, the smooth transition from the side surfaces of the seat body 30 to the side surfaces of the arm rests 22 is true of both upper and lower positions, as can be seen from the perspective views of FIGS. 1 and 2. Accordingly, in either position, the arm rest 22 will not encroach on the passenger areas located to the sides of the installed car seat 20 and therefore does not occupy additional area of the vehicle bench or bucket seat.

The arm rests 22 are desirably formed of a thermoplastic or thermosetting plastic composite molded into a thin outer shell. A detachable fabric cover with or without padding can also slip over each armrest and be attached in any suitable manner including, but not limited to, Velcro™, mounting posts, mounting plugs, adhesives, or mechanical fasteners such as hooks, buttons or straps.

Figure 3A:
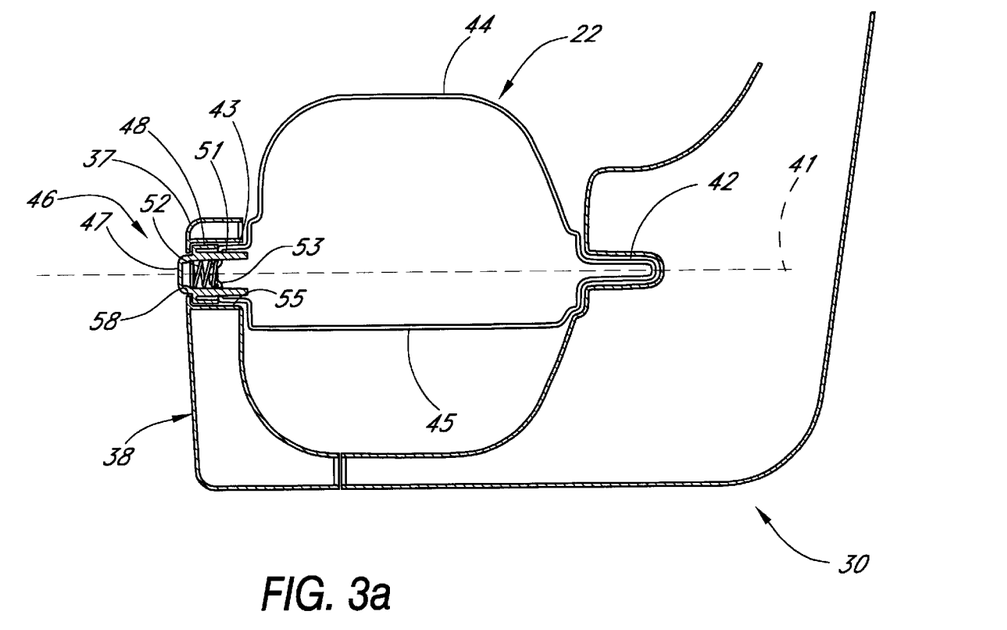
FIG. 3a is a cross-sectional side elevational view of an arm rest assembly of the car seat, with the arm rest in an upper position.
Figure 3B:
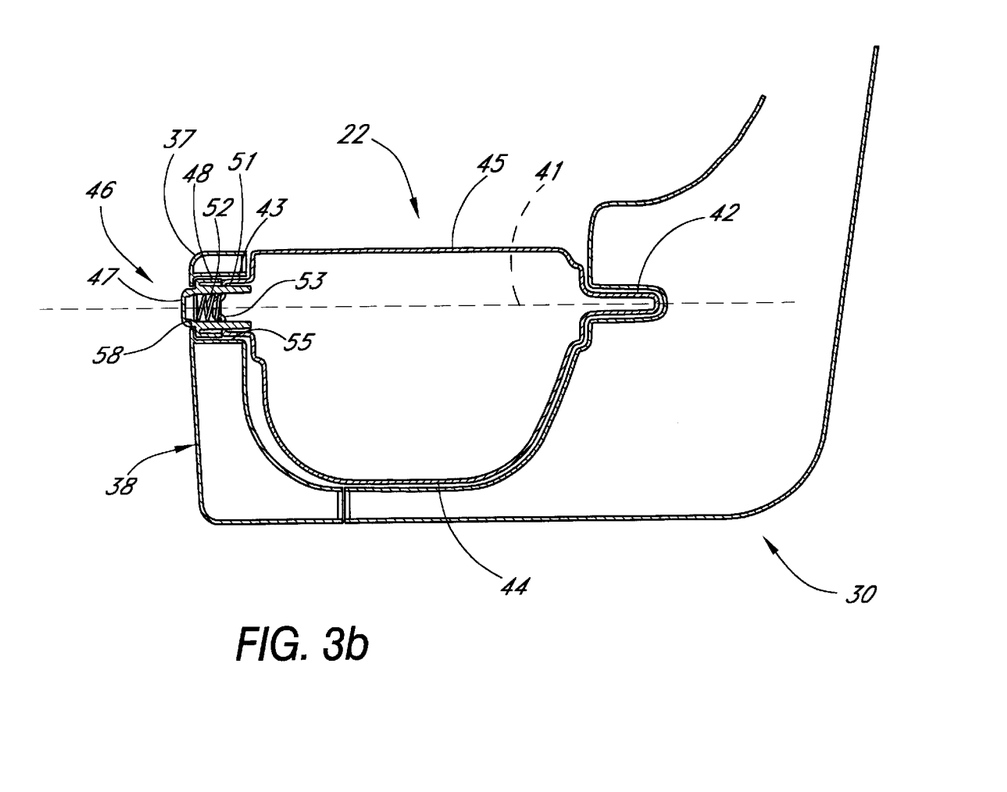
FIG. 3b is a view similar to that of FIG. 3a, but with the arm rest in a lower position.

Referring to FIGS. 3a and 3b, the rotational axis 41 of each arm rest 22 is defined by a back pivot pin 42 extending from one end of the arm rest 22 and a front pivot pin 43 extending from the opposite end of the arm rest 22. The following description focuses on one of the arm rests. It will be understood, however, that the description is equally applicable to both arm rests, which are mirror images of one another. The pivot pins 42, 43 journal within respective apertures provided in the seat body 30. In particular, the pivot pins 42, 43 journal within the side wall 35 of the back portion 34 and the arm rest post 37, respectively. Rotation of the arm rest 22 and a locking mechanism to prevent unwanted rotation are discussed in detail below. It will be understood that, in other arrangements, similar rotatable mounting can be achieved conversely, by extending protrusions from the seat body into apertures in the arm rests.

The cross-sectional views of FIGS. 3a and 3b also show the asymmetry of the arm rest 22 about the rotational or pivot axis 41, and two different effective heights of the arm rest 22 corresponding to two different rotational positions. The illustrated cam-shaped arm rest 22 comprises a lobe portion 44, the surfaces of which are farthest from the axis of rotation 41, and base portion 45, the surfaces of which are closest to the axis of rotation 41.

FIG. 3a shows the arm rest 22 in a first or upper position, wherein the lobe portion 44 of the arm rest 22 faces upwardly while the smaller base portion 45 faces downwardly. In this upper position, the lobe portion 44 extends above the surrounding surfaces of the illustrated seat body 30 and provides a first supporting surface of the movable arm rest 22. As previously noted, the upper arm rest position is appropriate for a child in the toddler stage.

FIG. 3b shows the arm rest 22 in a second or lower position, wherein the arm rest 22 is rotated 180° with respect to the upper position. In this lower position, the base portion 45 of the arm rest 22 faces upwardly while the lobe portion 44 faces downwardly. The base portion 45 is flush with the surrounding surfaces of the illustrated seat body 30 in this position, providing a second supporting surface of the moveable arm rest 22. Because the uppermost portion of the arm rest 22 is closer to the axis of rotation 41 in the lower position, as compared to the upper position, the effective height of the arm rest 22 is lower than that of FIG. 3a relative to the fixed portions of the seat body 30.

Figures 5A, 5B, 5C, 6A, 6B, 6C:
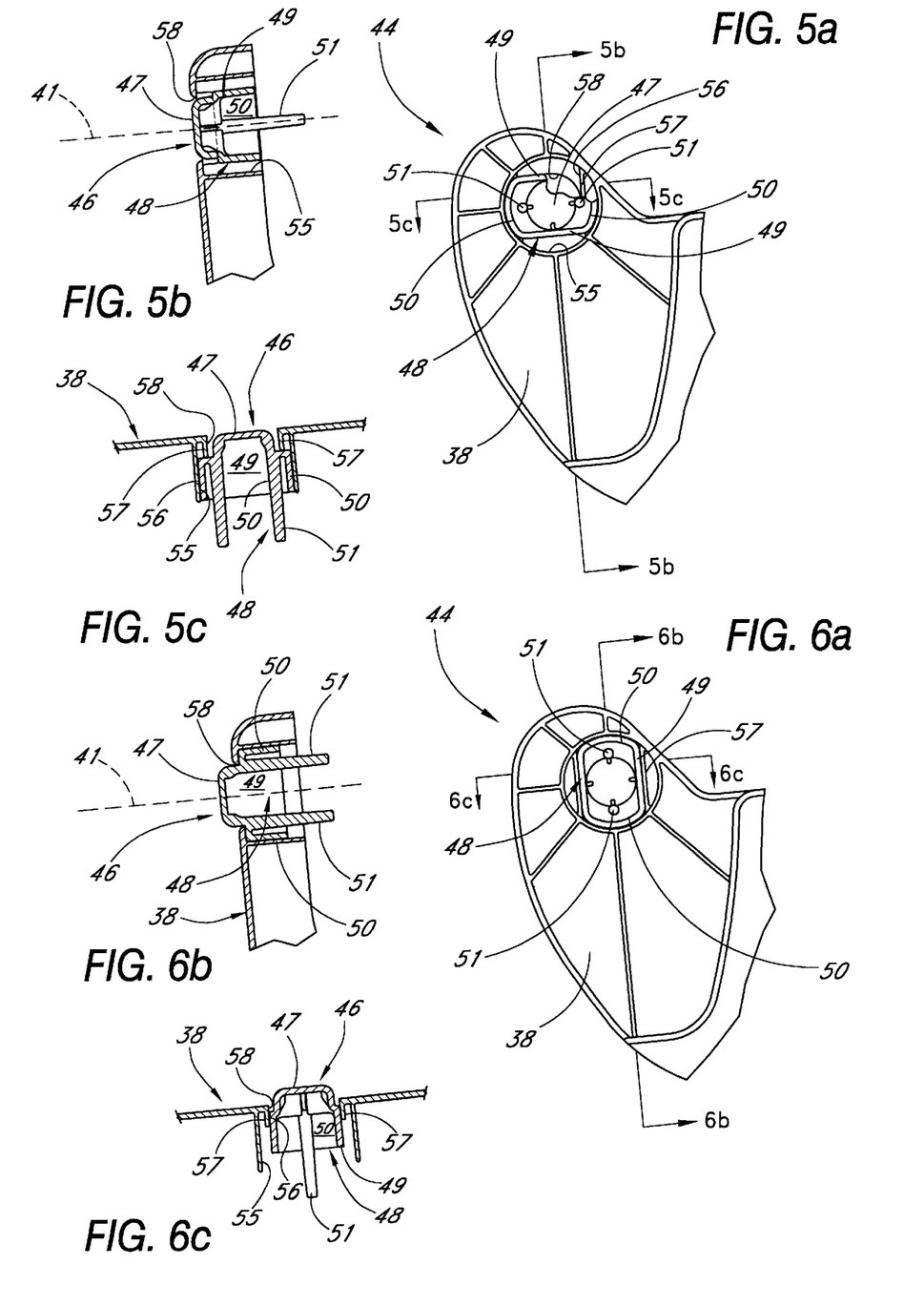

With reference to FIGS. 3, 5 and 6, the seat 20 includes a locking mechanism which reversibly locks the arm rest 22 in one of a plurality of rotational positions. As noted above, each rotational position represents a different arm rest height. Advantageously, the illustrated locking mechanism can maintain the arm rest 22 in one of two positions: the lower position (FIG. 3a) and the upper position (FIG. 3b). The skilled artisan will readily appreciate in light of the present disclosure, however, that many intermediate arm rest heights can be arranged by changing the rotational position of the arm rests, and that the locking mechanism can be adapted to selectively lock the arm rest in each desired position. The shape of this outer surface of the arm rest can also be arranged to provide a plurality of supporting surfaces corresponding to each desired rotational position.

The preferred locking mechanism comprises a push button assembly 46, which is rotationally coupled to the front pivot pin 43 of the arm rest 22, in combination with mating surfaces of the end plate 38. In particular, the push button assembly 46 comprises a preferably round button portion 47 at a front end and an integral oblong block 48 extending rearwardly therefrom. As best seen from FIGS. 5a and 6a, the illustrated block 48 is hollow and is defined by straight sides 49 and relatively shorter rounded ends 50. As shown, each of the sides 49 and ends 50 is preferably wider than the button portion 47 of the push button assembly 46.

The push button assembly 46 further comprises a pair of coupling shafts 51 and a spring 52. When assembled, the coupling shafts 51 extend into apertures within the front pivot pin 43 of the arm rest 22, thereby providing additional coupling rotation of the arm rest 22 with the push button assembly 46. The spring 52 is received at one end by an cylindrical recess within the oblong block 48. At the opposite end, the spring 52 frictionally receives a short stub portion 53 of the front pivot pin 43. The spring 52 thus biases the oblong block 48 and integral button 47 away from the arm rest 22.

Referring still to FIGS. 3, 5 and 6, the push button assembly 46 is mounted within a throughbore extending through the end plate 38, which provides the mating surfaces for the locking mechanism. As shown in FIG. 3, the throughbore extends from a front pin recess 54 within the arm rest post 37, in which the front pivot pin 43 of the arm rest 22 journals. The throughbore of the illustrated embodiment includes three distinct, aligned sections, best seen from FIGS. 5c and 6c: a cylindrical section 55; an oblong receptacle 56 defined by vanes 57 within the cylindrical section 55; and a button opening 58 in the front face of the end plate 38, just forward of the oblong receptacle 56.

From the top down or horizontal sectional views of FIGS. 5c and 6c, it can be seen that the oblong receptacle 56 is narrower (in the horizontal dimension) than the cylindrical section 55 in the horizontal dimension, and that the opening 58 in the front face is more narrow than the oblong receptacle 56. The oblong receptacle 56 is vertically coextensive with the cylindrical section 55 in the vertical dimension, and therefore can not be distinguished in the elevational or vertical cross-sections of FIGS. 5b and 6b.

FIGS. 5 and 6 illustrate the locking mechanism in unlocked and locked positions, respectively. In particular, the interior of the end plate 38 is shown in relation to the push button assembly 46 in the unlocked position (FIG. 5) and in the locked position (FIG. 6). While not shown in these views, it will be understood that the spring 52 (FIG. 3) biases the push button assembly 46 toward the front of the seat 20, i.e., into the paper in the view of FIGS. 5a and 6a and to the left in FIGS. 5b–5c and 6b–6c.

In the unlocked position of FIGS. 5a–5c, the oblong block 48 of the push button assembly 46 is positioned rearwardly and rotationally out of alignment with the oblong receptacle 56. The front surface of the oblong block 48 is biased toward the vanes 57 which define the oblong receptacle. The rounded ends 50 of the oblong block 48 have a radius slightly smaller than the cylindrical section 55 of the throughbore, such that the oblong block 48 is free to rotate within the cylindrical section 55. The arm rest 22 (FIG. 3), rotationally coupled to the oblong block 43 by way of the coupling shafts 51 and the straight sides 49 of the oblong block 48, is also free to rotate, and the locking mechanism is thus "unlocked." The illustrated unlocked position shows the oblong block 48 about 90° out of alignment with the oblong receptacle 56. It will be understood, however, that the arm rest would be unlocked (i.e., free to rotate) whenever the oblong block is even slightly out of alignment with the oblong receptacle 56.

FIGS. 6a–6c show the interior of the end plate 38, illustrating the locking mechanism in a locked position. In the illustrated locked position, the oblong block 48 is aligned with the oblong receptacle 56 and held biased within the receptacle 56 by the spring (not shown in this view). The button portion 47 extends forwardly through the button opening 58 in the end plate 37. The straight sides 49 of the block 48 engage with the vanes 57, thus preventing rotation of the oblong block 48 within the oblong receptacle 56. The arm rest 22 (FIG. 3) is rotationally coupled to the oblong block 56 by way of the coupling shafts 51 and the straight sides 49 of the oblong block 48, so that the arm rest 22 cannot rotated either, and the locking mechanism is thus "locked."

Figure 4A:
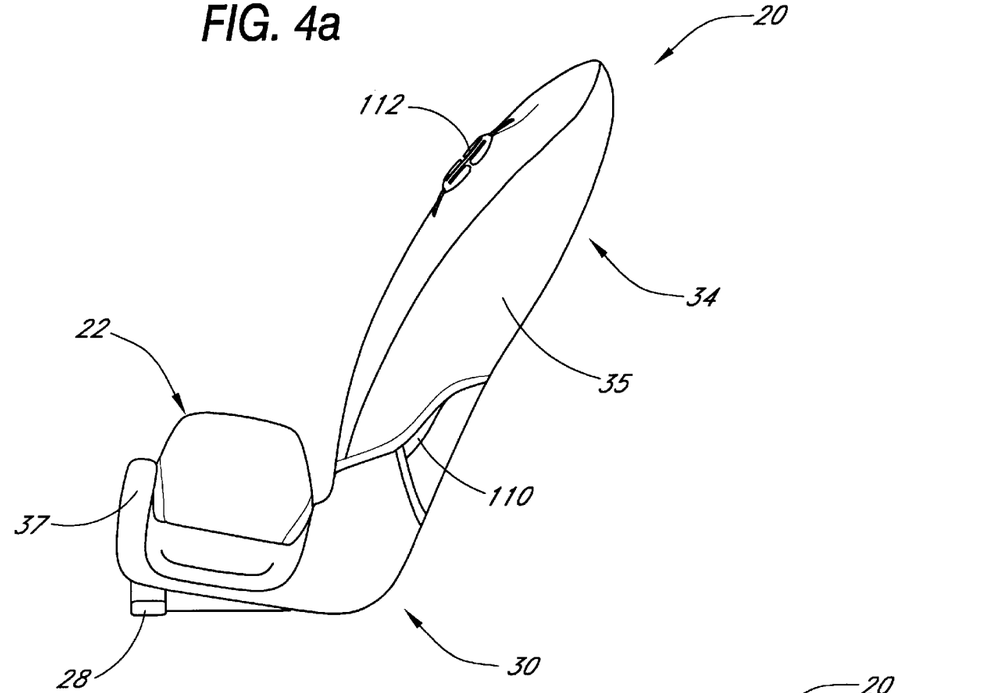
FIG. 4a is a side elevational view of the car seat in a reclined position with the arm rest in an upper position.

In operation, a parent may wish to move the arm rests 22 from the lower position (FIGS. 3b and 4b) to the upper position (FIGS. 3a and 4a). For example, the parent may wish to configure the seat 20 for a toddler. Initially, the locking mechanism is locked (FIG. 6) in the lower position, with the oblong block 48 of the push button assembly 46 engaged with the oblong receptacle 56, while the button portion 47 protrudes through the button opening 58 in the end plate 38.

In order to unlock the locking mechanism, the parent merely depresses the button portion 47 against the bias of the spring 52, which causes the oblong block 48 to disengage from the oblong receptacle 56. The parent may then slightly rotate the arm rest, which causes the oblong block 48 to rotate out of alignment with the oblong receptacle 56. This places the locking mechanism in an unlocked position (FIG. 5). At this point, the parent can release the button portion 47. The locking mechanism remains unlocked, with the oblong block 48 supported by the vanes 57, while the arm rest is rotated until the oblong block 48 is again aligned with the oblong receptacle 48. In the illustrated embodiment, such alignment occurs after the arm rest and push button assembly 46 have rotated 180°, whereupon the spring causes the oblong block 48 to snap into the oblong receptacle 56, again locking the locking mechanism arid preventing further rotation of the arm rests 22.

Advantageously, the push button assembly provides a quick release mechanism by which mere depression of a button and slight rotation of the arm rest frees the arm rest for further rotation. The user need not maintain pressure on the button during further rotation. Nor must the user take care in aligning the arm rest before locking the next position. Rather, the arm rest automatically locks into place when the next lockable position is reached (after rotation of 180° in the illustrated embodiment). As will be appreciated by those of skill in the art, varying the geometry of the block and the receptacle will vary the angular rotation between locked positions as well as the number of locked positions. For example, a square oblong block would lock into place in a mating receptacle every 90°, resulting in four rotational lockable positions. The contours of the arm rest can be configured to have four corresponding support surfaces at 90° to one another around the rotational axis 41. Similarly, star-shapes, hexagons, octagons, etc. can be used to alter the number and angular position at which the arm rests can be locked.

Adjustable Harness System

With reference to FIG. 7, the car seat 20 also has a five point seat belt harness system 26, which incorporates features disclosed in U.S. Pat. No. 5,580,126, entitled "Five-Point Booster Car Seat Belt System", issued Dec. 3, 1996 to Sedlack. The disclosure of U.S. Pat. No. 5,580,126 is hereby expressly incorporated by reference. Like the harness disclosed in the '126 patent, the illustrated harness system 26 has a single crotch strap 62, a left hand side (LHS) web 63 and a right hand side (RHS) web 64.

The upper end of the crotch strap 62 is secured to a buckle 66. The LHS web 63 is threaded through a LHS shield portion 70, which divides the LHS web 63 into a LHS lateral lap belt and a LHS longitudinal shoulder strap. Similarly, the RHS web 64 is threaded through a RHS shield portion 72, dividing the RHS web 64 into a RHS lateral lap belt and a RHS shoulder strap. Each of the LHS and RHS shield portions, 70, 72 include tongues which are selectively received by the crotch buckle 66 in a manner similar to that of conventional seat belt buckles.

The shoulder strap portions of the LHS web 63 and RHS web 64 are each threaded through left and right portions of a harness tie 74, located above the shields, 70, 72. The portions of the harness tie 74 are selectively fitted together with a coupling which allows the two portions to be easily fastened and unfastened. The harness tie 74 serves to keep the shoulder straps close together and positioned on the child's shoulders.

Attachment and adjustment of the seat harness system 26 relative to the seat body 30 will now be described. The lower end of the crotch strap 62 is threaded through one of a plurality of seat grommets 68 (see also FIG. 2), and secured at the underside of the seat portion 36 in any suitable manner, preferably in an easily reversible manner. For example, as will be appreciated by the skilled artisan, a securing rod 68a (FIG. 9) longer than the width of the seat grommet 68 can be passed through a loop in the lower end of the crotch strap 62 after passing the loop through the seat grommet 68. The rod is then press-fitted into a receiving groove 68b (FIG. 9) on the underside of the seat portion 36. To remove the crotch strap 62, the securing rod 68a is pried loose from the seat portion 36 and removed, at which point the crotch strap 62 can be withdrawn from the seat grommet 68.

The illustrated LHS web 63 and RHS web 64 are formed of a single strap which loops around the bottom of the seat portion 36 of the seat body 30. The free ends of the single strap are thus passed through hip grommets (not visible) at the juncture of the seat bottom 36 and the arm rests 22. The free ends then thread through the shield portions 70, 72, the portions of the harness tie 74, and then through one of a plurality of pairs of back grommets 69 through the back portion 34 of the seat body 30.

FIG. 8 shows the free ends of the LHS web 63 and RHS web 64 emerging through one of the pairs of back grommets 69 which extend to the backside of the back portion 34, note that each pair of grommets 69 has a third grommet 69 between them. The webs 63, 64 are adjustably secured at the back side through a belt adjuster 76. A double adjuster bar 78 is arranged for vertical translation within a stamping 80. The stamping 80 is provided with two rectangular openings 82 which cooperate with the adjuster bar 78 to create a double buckle locking mechanism which secures both ends or webs 63, 64 of the harness system 26. In particular, as illustrated with respect to the RHS web 64, each of the webs 63, 64 is threaded upward behind a lower portion 84 of the stamping 80, through one of the openings 82 and over the adjuster bar 78. The webs 63, 64 are then looped downward over the adjuster bar 78 and behind the lower portion 84 of the stamping 80, each side thus serving a conventional adjustment function.

The weight of the adjuster bar 78 and downward tension from the shoulder straps keeps the webs 63, 64 secure in the adjuster 76. To tighten the shoulder strap portions, the loose ends of the webs 63, 64 can simply be pulled downwardly, as illustrated with respect to the RHS web 64. To loosen the shoulder straps, the belts are slackened from the loose end and the slack is pulled through the belt adjuster 76.

Referring again to FIG. 7, the illustrated seat 20 is configured to adjust the positions of the attachment for the seat harness 26. In particular, the attachment position of the crotch strap 62 along the seat bottom portion 36 is adjustable to accommodate a large size range of children. In the illustrated embodiment, this adjustability is provided by the plurality of seat grommets 68, which are spaced at different distances from the back portion 34. The crotch strap 62 can thus be mounted in the seat grommet 68 which is closest to but not under the child.

Additionally, the plurality of pairs of back grommets 69 are provided in the seat back portion 34, spaced at different distances from the seat portion 36 to accommodate children of different heights. Desirably, the LHS web 63 and the RHS web 64 are threaded through the pair of back grommets 69 located at or just above the child's shoulders. The ends of the webs 63, 64 can then be secured in the belt adjuster 76 behind the seat back 34, as described above.

Reclining Mechanism

With reference now to FIGS. 9–12, the car seat 20 is also advantageously adapted for reclining. Rather than reclining a back support relative to the seat portion, the entire seat body 30 reclines relative to the seat base 28. In particular, the seat base 28 is pivotally connected to the rear or back end of bottom of the seat body 30. The front end of the seat base 28 is thus height adjustable with respect to the seat body 30.

Figure 9:
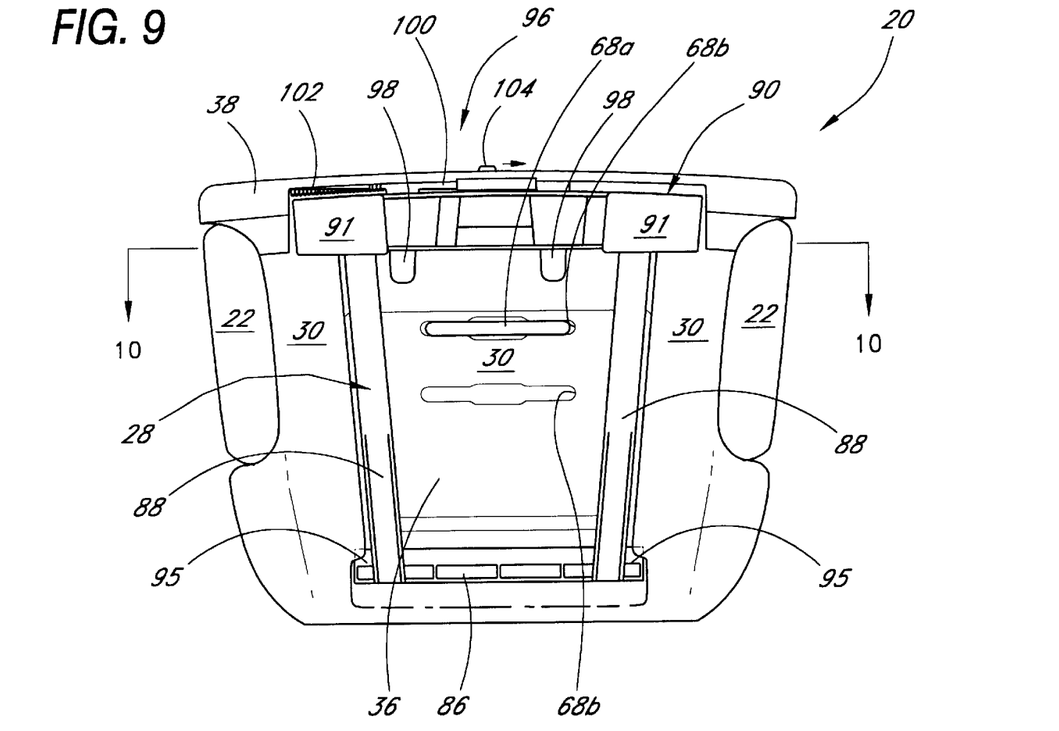
FIG. 9 is a bottom plan view of the car seat, showing aspects of a reclining mechanism.
Figure 10:
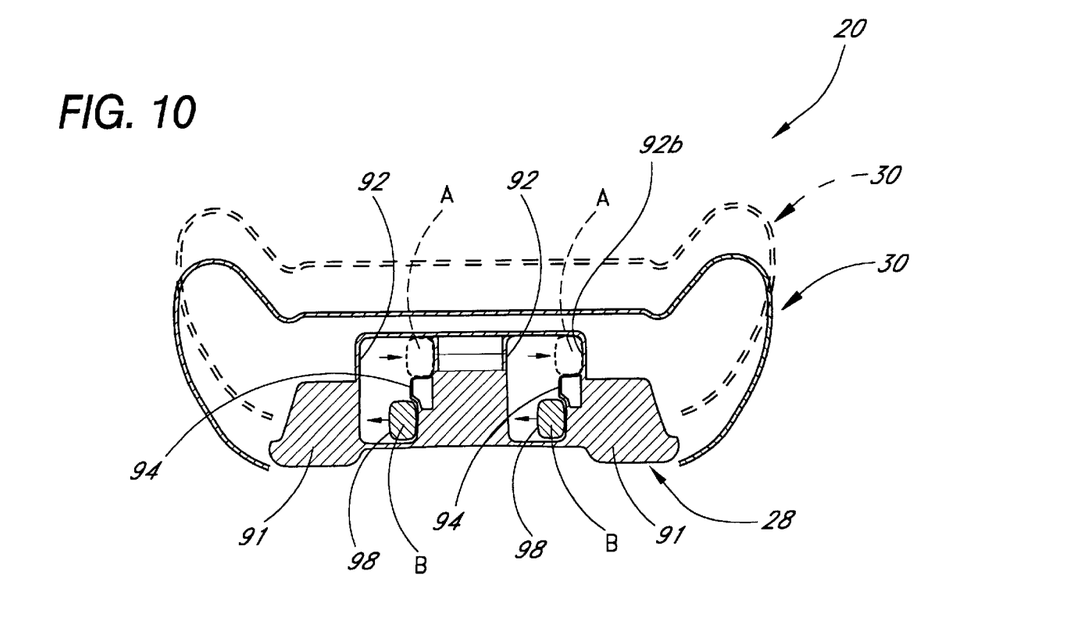
FIG. 10 is a front sectional view taken along lines 10—10 of FIG. 9, showing the reclining mechanism in an upright position.

Referring to FIGS. 9 and 10, the seat base 28 is shaped like a truss, comprising a pivot shaft 86 at a back end, a pair of lever arms 88 extending forwardly from the pivot shaft 86, and a front portion 90 extending between the front ends of the lever arms 88. The front portion 90 comprises a pair of support legs 91 laterally connected by a connecting section. At least one positioning track 92 is formed in the front portion 90 of the base 28. In the illustrated embodiment, the front portion 90 comprises two generally C-shaped (see FIG. 10)positioning tracks 92, each extending longitudinally through the connecting section between the support legs 91. Each positioning track 92 comprises a central channel 92a, with an upper groove 92b and a lower groove 92c extending laterally therefrom. The illustrated lower groove 92c is slightly more shallow than the upper groove 92b. A shoulder 94 protrudes into each track 92 to separate the upper groove 92b from the lower groove 92c.

The seat base 28 is received within mating recesses of the seat body. In particular, the pivot shaft 86 is received within a pivot channel formed in the bottom surface of the seat body 30. The channel terminates at lateral ends in receiving slots 95 extending into the seat body 30. The two lateral ends of the pivot shaft 86 are captured and journal within the slots 95. The lever arms 88 and front portion 91 also fit within mating recesses formed in the bottom surface of the seat body 30. Preferably, the recesses in the seat body 30 are configured to allow the seat base 28 to be completely recessed without protruding below the seat body 30.

The positioning tracks 92 of the seat base 28 interact with an actuator 96 which reciprocates in a channel between the end plate 38 and the seat base 28. The illustrated actuator 96 comprises two fingers 98 which extend into the positioning tracks 92 of the base portion. The fingers 98 are integral with and extend rearwardly from an actuator plate 100, which reciprocates laterally parallel to the end plate 38. A biasing element laterally biases the actuator plate 100 and integral fingers 98 relative to the end plate 38. The illustrated biasing element comprises a spring 102 engaged with a mounting shaft which extends laterally from one end of the actuator plate 100. It will be recognized that, in other arrangements, the biasing element can comprise a torsion spring, a leaf spring, an elastic cord, or any other suitable biasing means. A handle 104 or pull tab extends forward from the flat plate 100 through all opening in the end plate 38.

Figure 11A:
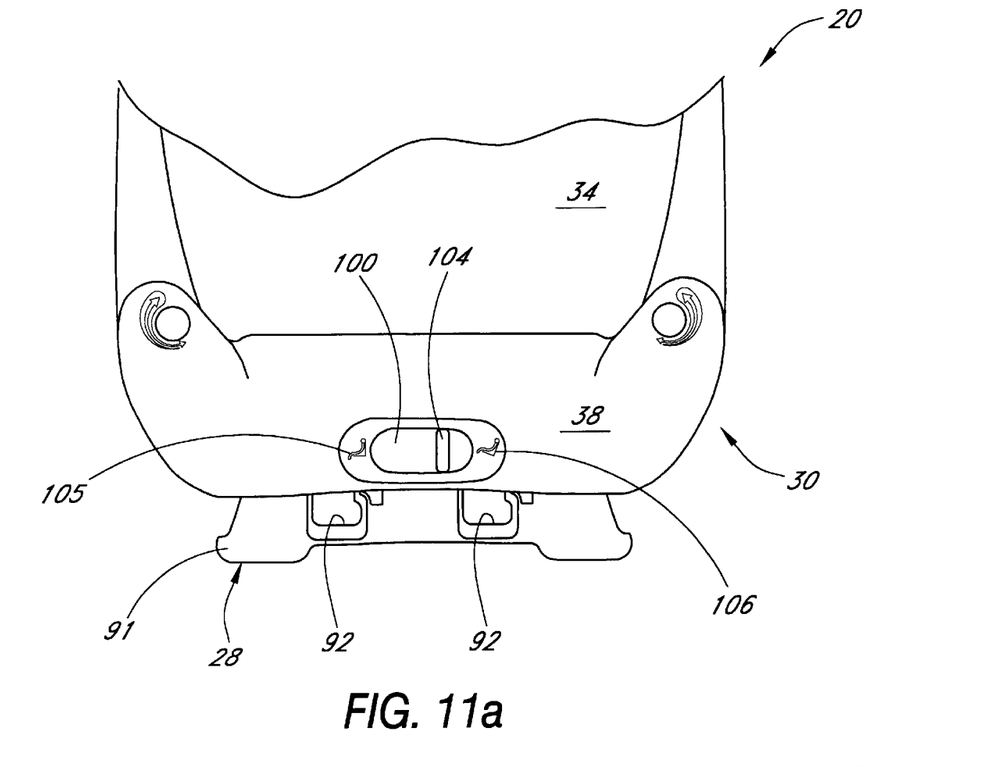
FIG. 11a is a partial front elevational view of the car seat, with a base portion extended to place the car seat in a reclined position.
Figure 11B:
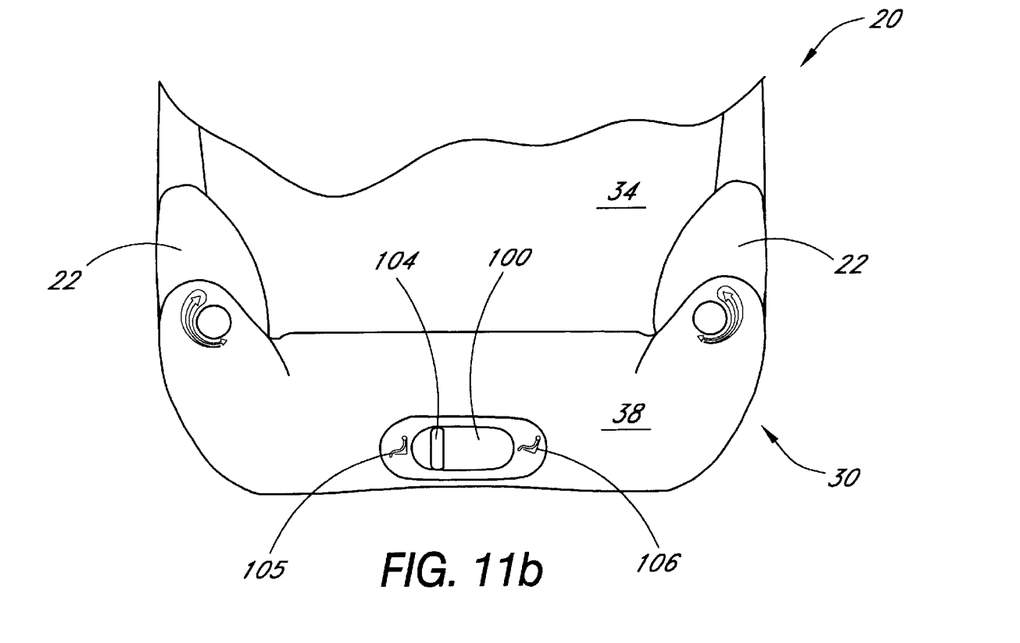
FIG. 11b is a view similar to that of FIG. 11a, with the base portion retracted to place the car seat in an upright position and with the arm rests in an upper position.

FIG. 10 shows the seat 20 in an upright position, wherein the fingers 98 are in a position B within the lower grooves 92c of the positioning tracks 92. Each finger 98 is biased to the right, in the view of FIG. 10, by the spring 102 (shown in FIG. 9). Each finger 98 thus engages with one of the shoulders 94, thus preventing the seat base 28 from falling relative to the seat body 30 if the seat 20 were held in the air. When mounted within a car, however, it will be understood that the weight of the seat body 30 and any child seated therein urges the fingers 98 downwardly relative to the positioning tracks 92. FIG. 11b also shows the seat 20 in the upright position, with handle 104 in a left position near a first insignia 105 which indicates the upright position.

FIG. 10 also shows, in dotted lines, the positions of the seat body 30 and fingers 98 relative to the seat base 28 in a reclined position. The fingers 98 are biased toward the position A within the upper grooves 92b of their corresponding positioning tracks 92. The upper grooves 92b are laterally more recessed than the lower grooves 92c, such that the fingers 98 rest upon a large upper surface of the shoulder 94. The interaction of the fingers 98 and the shoulder 94 supports the weight of the seat body 30 and any child seated therein. FIG. 11a also shows the seat 20 in the reclined position, with the handle 104 in a right position near a second insignia 106 which indicates the reclined position.

In operation, the handle 104 allows a user to slide the integral plate 100 to the left against the bias of the spring 102, thus retracting the fingers 98 from either the upper grooves 92b or lower grooves 92c. The user can then vertically translate the seat base 28 relative to the seat body 30, as the fingers 98 reciprocate vertically within the central channels 92a. The handle 104 is then released, and the spring 102 urges the flat plate 100 to the right, thus urging the fingers 98 into the other of the upper grooves 92b or lower grooves 92c.

For example, with the seat 20 initially in the upright position (FIG. 11b), the fingers 98 are biased in the position B (FIG. 10) in the lower grooves 92c. The user slides the handle 104 to the left, thus moving the fingers 98 into the central channels 92a. The seat body 30 can then be lifted, and the front portion 90 of the seat base 28 falls under the influence of gravity. The seat base 28 pivots as the pivot shaft 86 journals within the receiving slots 95. The user can then release the handle 104, and the fingers 98 are urged by the spring 102 into the upper grooves 92b (position A in FIG. 10). In this position, the front end of the seat 20 is elevated upon the support legs 91 of the seat base 28 while the height of the back portion remains unchanged. Accordingly, the angle of inclination of the seat back portion 34 changes relative to the seat base 28. The seat 20 is thus converted to the reclined position (see FIG. 4a).

In the illustrated embodiment, the reclining mechanism is adjustable between two locking positions (A and B), which represent different angles of recline (upright and reclined). The skilled artisan will recognize, however, that a plurality of vertically spaced shoulders can be provided within the positioning track, thereby providing a plurality of reclined positions. The shoulder 94 enables the car seat 20 to be locked into either an upright or a reclined position.

Adjustable Head Support

Figure 12:
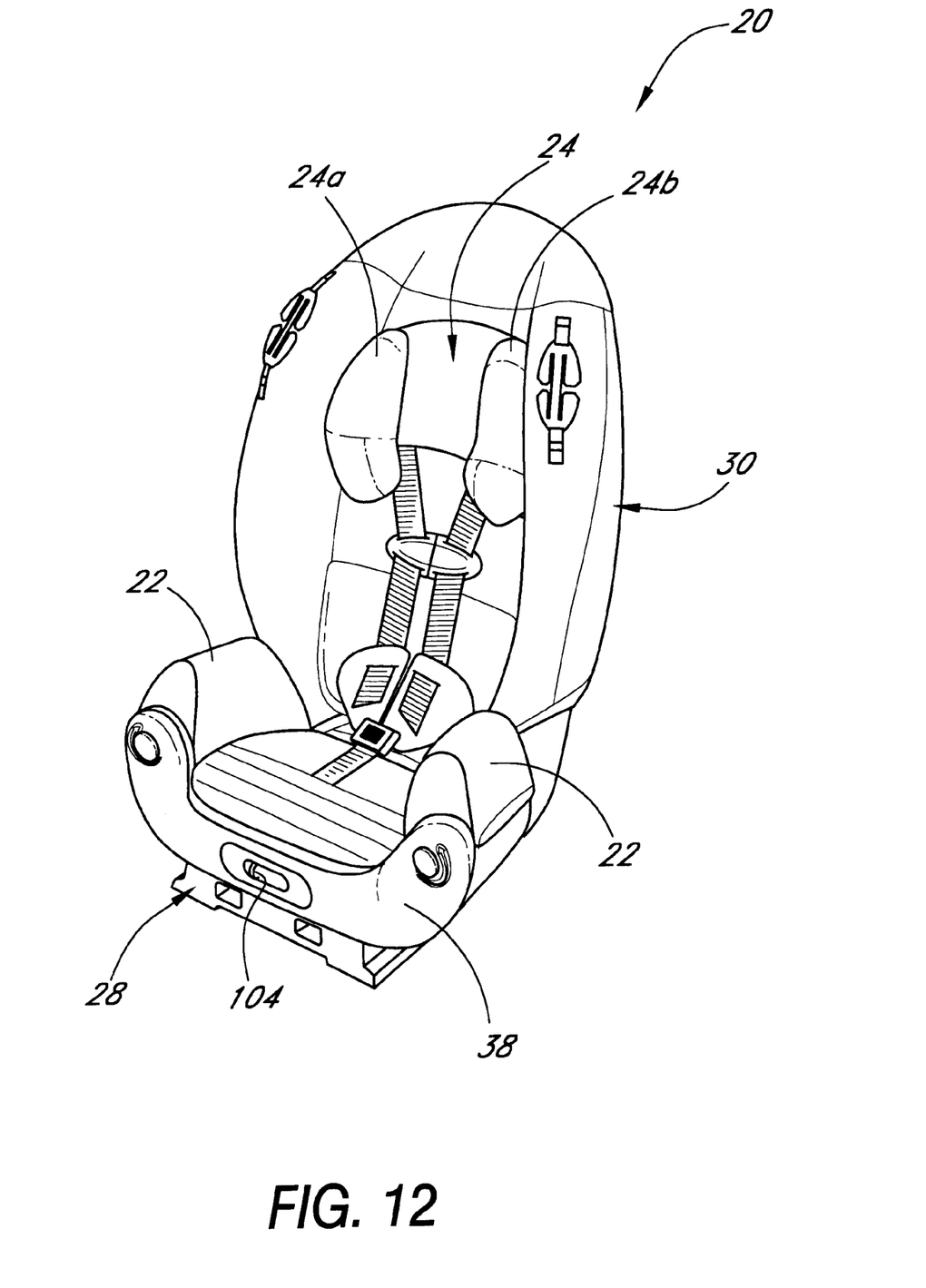
FIG. 12 is a perspective view of the car seat with a movable and removable head support pillow.

The illustrated car seat 20, as shown in FIG. 12, also has an adjustable head support pillow 24. The pillow 24 is desirably formed of a soft padding material with a protective fabric or liquid resistant covering. The pillow 24 is contoured to support the head of a child. In addition, the pillow 24 is desirably designed to coddle the head of a sleeping child.

To mount the pillow 24, a plurality of hooks are provided on the back surface of the pillow 24. The hooks are adapted to hang the pillow 24 from any of the plurality of vertically spaced back grommets 69 previously discussed with respect to the harness system 26 (FIGS. 7 and 8), or from a pair of upper slots 109 (see FIG. 7) above the grommets 69. Where both the harness system 26 and the head support pillow 24 are to be implemented, as is desirable for safely restraining a toddler, the support pillow 24 is hung from the upper slots 109 above the back grommets 69 through which the harness system 26 is threaded. As will be recognized by those of skill in the art, any other suitable means for fastening the pillow 24 to the seat body 30 may also be employed, such as hook and loop material, zippers, buttons, adhesives, snaps, magnets, etc.

Installation of the Car Seat

Figure 4B:
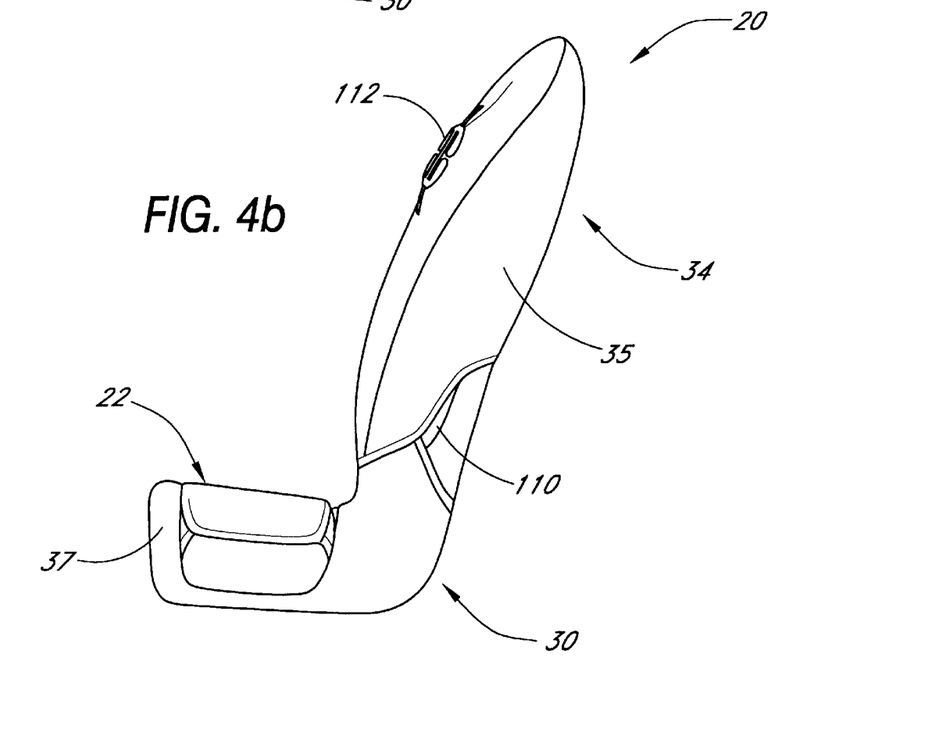
FIG. 4b is a side elevational view of the car seat in an upright position with the arm rests in a lower position.

With reference to FIGS. 1 and 4, the car seat 20 is secured to a vehicle seat 107. For children under about 45 lbs., the car seat 20 may be secured to a vehicle seat 107 by passing a vehicle lap belt 108 through a belt channel 110 (FIGS. 4a and 4b) located along the back portion 34 of the seat body 30. The belt channel 110 is desirably exposed by lifting a flap 111 in the padding and cover 32 of the car seat 20 (see FIG. 2). To securely install the seat 20, the car seat 20 is placed firmly on the vehicle seat 107 against the vehicle seat back. The flap 111 is lifted and the vehicle lap belt 108 is threaded through the channel. The vehicle seat belt 108 is then buckled.

While not shown in FIG. 1, it will be understood that for larger children (e.g., 40–60 lbs.), the car seat 20 can be further secured to a vehicle seat by engaging the car seat 20 with a vehicle shoulder strap, which is typically integral with the vehicle lap belt 108. The illustrated car seat 20 is provided with two clips 112 (see FIG. 1) for this purpose, as disclosed in U.S. Pat. No. 5,580,126. In most vehicles, the shoulder strap is threaded through the clip 112 closest to the shoulder strap mounting on the vehicle. The clip 112 allows the shoulder strap of the vehicle seat belt to be secured to the car seat 20 and to be positioned to rest on the child's shoulder. In this way the clip 112 adjusts the angle of inclination of the shoulder belt so that it would not be in contact with the face and neck of the child seated in the car seat 20, but rather passes over the child's shoulder. In the illustrated embodiment, the clips 112 are secured by straps and can be moved upward and downward relative to the seat body 30 in order to allow further customizing the car seat 20 to the size of the particular child occupant.

Summary of Advantages

The illustrated car seat 20 thus incorporates several features of particular advantage, individually or in combination, which permit adjustment of the car seat 20 for restraining children of different sizes in a moving vehicle. The adjustability is particularly adapted to accommodating both toddlers (e.g., 20–40 lbs) and older children (e.g., 30–65 lbs.) not yet large enough to use vehicle seatbelts. Conventionally, two separate car seats of different sizes are required for these two age groups. A parent of a toddler can thus adjust the car seat 20 as child grows, rather than buying a new car seat of a bigger size. Furthermore, the simplicity of the adjustment mechanisms described herein permits parents to quickly and easily adapt the car seat 20 for differently sized children.

The skilled artisan will readily recognize that each of the features can be adapted to provide multiple adjustment positions. Advantageously, however, many of the features in the illustrated embodiment have two positions, simplifying adjustment and reducing manufacturing costs. For example, the illustrated arm rests 22 and reclining mechanism are each adjustable between two positions.

In a typical toddler configuration, the arm rests 22 are placed in the upper position, the base portion 28 extends to recline the car seat 20 (FIG. 4a), and the harness system 26 secures the child 31 in the seat (FIG. 1). The harness 26 will generally be mounted to the seat body 30 through the rearward seat grommet 68 and through one of the lower seat back grommets 69, depending upon the size of the toddler. The head support cushion 24 (FIG. 12) is also desirably employed, hooked into one of the upper seat back grommets 69.

For a larger child or youth, the arm rests 22 can be adjusted to the lower position to accommodate the increased torso width, while the seat base 28 can be retracted to the upright position (FIG. 4b) or left in the reclined position (FIG. 4a). The harness system 26 (FIG. 7) can be adapted by threading the webs 63, 64 through higher seat back grommets 69 and securing the crotch strap 62 to a more forward seat grommet 68. Alternatively, the harness system can be omitted and the lap/shoulder belt of the vehicle is used to restrain the child, with the shoulder belt threaded through the clip 112 and across the child's chest. The head support cushion can also be omitted as the child grows.

While the above configurations are recommended for the toddler and youth-sized children, the advantageously independent adjustment mechanisms permit deviation from these configurations. The car seat 20 can thus be adapted to custom fit a child to optimize the comfort and support needs of the child.

Although this invention has been described in terms of a certain preferred embodiment, other embodiments apparent to those of ordinary skill in the art are also considered within the scope of this invention. Accordingly, the scope of the present invention is intended to be defined only by the claims that follow.

We claim:

1. A child restraint seat comprising:

a seat body having a back portion and a seat portion; and two arm rests movably mounted to the seat body and movable between a first position and a second position, the arm rests extending from and being substantially normal to the back portion of the seat body, each of the arm rests comprising a first supporting surface and a second supporting surface, wherein, when the arm rests are in the first position, the first supporting surfaces are positioned higher than the second supporting surfaces relative to the seat portion, and, when the arm rests are in the second position, the second supporting surfaces are positioned higher than the first supporting surfaces relative to the seat portion.

2. The child restraint seat of claim 1 further comprising two rotational axes intersecting and extending through the back portion of the seat body, the rotational axes generally corresponding to the arm rests whereby the arm rests are moveable between the first and second positions through rotation about the rotational axes.

3. The child restraint seat of claim 2, wherein the rotational axis of each of the arm rests extends substantially parallel to the seat portion and substantially normal to the back portion of the seat body.

4. The child restraint seat of claim 2 further comprising locking means for preventing arm rest rotation relative to the seat body when the arm rests are positioned in the first position and the second position, the locking means being positioned between the seat body and the arm rests.

5. The child restraint seat of claim 4, wherein the locking means of each of the arm rests includes a male member attached to one of the seat body and a corresponding arm rest, a female member attached to the other of the seat body and the corresponding arm rest, and a biasing element, the male member being urged into a rotation locking relation with the female member by the biasing element when the corresponding arm rest is in one of the first and second positions.

6. A child restraint seat comprising:

a seat body having a back portion and a seat portion; and tow arm rests movably mounted to the seat body and movable between a first position and a second position, the arm rests extending substantially normal to the back portion of the seat body, each of the arm rests comprising a first arm supporting surface and a second arm supporting surface, wherein, when the arm rests are in the first position, the first arm supporting surfaces are positioned higher than the second arm supporting surfaces relative to the seat portion, and, when the arm rests are in the second position, the second arm supporting surfaces are positioned higher than the first arm supporting surfaces relative to the seat portion, wherein the biasing element comprises a compression spring.

7. The child restraint seat of claim 5, wherein the male member and the female member are movable along the rotational axis.

8. The child restraint seat of claim 5, wherein the locking means further comprises a push-button release for disengaging the male member from the female member.

9. The child restraint seat of claim 8, wherein the push button is movable along the rotational axis.

10. The child restraint seat of claim 4, wherein each arm rest is freely rotatable at all angular positions except the first and second positions.

11. A child restraint seat comprising:

a seat body having a back portion and a seat portion; and two arm rests movably mounted to the seat body and movable between a first position and a second position, the arm rests extending substantially normal to the back portion of the seat body, each of the arm rests comprising a first arm supporting surface and a second arm supporting surface, wherein, when the arm rests are in the first position, the first arm supporting surfaces are positioned higher than the second arm supporting surfaces relative to the seat portion, and, when the arm rests are in the second position, the second arm supporting surfaces are positioned higher than the first arm supporting surfaces relative to the seat portion, wherein the arm rests do not substantially protrude laterally from the seat body in each of the first and second positions.

12. The seat of claim 11, wherein a biasing element urges the locking member into the first position.

13. The seat of claim 12, wherein the biasing element urges the locking member into the second position.

14. The seat in claim 11, further comprising at least two movable arm supports movably mounted to the seat body and movable in a substantially vertical direction relative to the seat portion to adjust a height of the arm supports relative to the seat portion.

15. A method of adjusting a child restraint seat, comprising:

providing a seat body having a seat bottom portion and an arm rest, which extends substantially parallel to a side of the seat bottom portion, the arm rest having a first supporting surface and a second supporting surface;

rotatably mounting the arm rest to the seat body for rotation about an axis substantially parallel to the side of the seat bottom portion; and rotating the arm rest about the axis between a first position and a second position to adjust a height thereof, wherein, when the arm rest is in the first position, the first supporting surface is positioned higher than the second supporting surface relative to the seat bottom portion, and, when the art rest is in the second position, the second supporting surface is positioned higher than the first supporting surface relative to the seat bottom portion.

16. The method of adjusting a child restraint seat, comprising:

providing a seat body having a back portion and a seat portion;

providing an arm rest that extends from and is substantially normal to the back portion of the seat body, the arm rest having a first arm supporting surface and a second arm supporting surface;

rotatably mounting the arm rest to the seat body for rotation about an axis substantially parallel to the side of the seat portion; and rotating the arm rest about the axis between a first position and a second position to adjust a height thereof, wherein, when the arm rest is in the first position, the first arm supporting surface is positioned higher than the second arm supporting surface relative to the seat portion, and, when the arm rest is in the second position, the second arm supporting surface is positioned higher than the first arm supporting surface relative to the seat portion.

17. The method of claim 15, further comprising pivotally connecting the seat to a platform below the seat, and pivoting the seat with respect to the platform to recline the seat.

18. The child restraint seat of claim 2, wherein the arm rests do not substantially protrude laterally from the seat body in each of the first and second positions.

19. A child restraint seat comprising:

a seat body having a back portion and a seat portion;

two arm rests, the arm rests being movably mounted to the seat body to move between a first position and a second position, the arm rests extending from and being substantially normal to the back portion of the seat body, each of the arm rests having a first arm supporting surface when moved to the first position and a second arm supporting surface when moved to the second position, the first arm supporting surface being higher than the second arm supporting surface relative to the seat portion.

20. A child restraint seat comprising:

a seat body having a back portion and a seat portion; and two arm rests movably mounted to the seat body and movable between a first position and a second position, the arm rests extending substantially normal to the back portion of the seat body, the arm rests being within an outside contour of the seat body in both the first and second positions, each of the arm rests comprising a first arm supporting surface and a second arm supporting surface, wherein, when the arm rests are in the first position, the first arm supporting surfaces are positioned higher than the second arm supporting surfaces relative to the seat portion, and, when the arm rests are in the second position, the second arm supporting surfaces are positioned higher than the first arm supporting surfaces relative to the seat portion.

21. The child restraint seat of claim 20, wherein the arm rests are contoured to blend into exterior side portions of the seat body.

22. A child restraint seat comprising:

a seat body having a back portion and a seat portion; and two arm rests movably mounted to the seat body and movable between a first position and a second position, the arm resting extending substantially normal to the back portion of the seat body, each of the arm rests comprising a first arm supporting surface and a second arm supporting surface, wherein, when the arm rests are in the first position, the first arm supporting surfaces are positioned higher than the second arm supporting surfaces relative to the seat portion, and, when the arm rests are in the second position, the second arm supporting surfaces are positioned higher than the first arm supporting surfaces relative to the seat portion, wherein the first supporting surfaces in the first position are higher than the second supporting surfaces in the second position relative to the seat portion.

23. A child restraint seat comprising:

two arm rests movably mounted to the seat body and movable between a first position and a second position, the arm resting extending substantially normal to the back portion of the seat body, each of the arm rests comprising a first arm supporting surface and a second arm supporting surface, wherein, when the arm rests are in the first position, the first arm supporting surfaces are positioned higher than the second arm supporting surfaces relative to the seat portion, and, when the arm rests are in the second position, the second arm supporting surfaces are positioned higher than the first arm supporting surfaces relative to the seat portion, wherein the are rests each have a rotational axis intersecting and extending through the back portion of the seat body, and the first and second supporting surfaces are parallel to the rotational axis.

24. The child restraint seat of claim 23, wherein the arm rests each have a lobe portion on one side of the rotational axis and a base portion on an opposite side of the rotational axis, the lobe portion including the first supporting surface and the base portion including the second supporting surface.

25. The child restraint seat of claim 24, wherein the lobe portion has a lobe height measured from the rotational axis to the supporting surface, the base portion has a base height measured from the rotational axis to the second supporting surface, and the lobe height is greater than the base height.

* * * * *